United States Patent [19]

Yang

[11] Patent Number: 5,170,856
[45] Date of Patent: Dec. 15, 1992

[54] WEIGHING SCALE WITH FLUID PRESSURE TRANSMISSION MEANS

[76] Inventor: Li-Hsiang Yang, No. 22-3, Hao Chin Road, San Shen Village, Pu Yuan Hsiang, Changhua, Taiwan

[21] Appl. No.: 751,789

[22] Filed: Aug. 29, 1991

[51] Int. Cl.$^5$ .............................................. G01G 5/04
[52] U.S. Cl. .................................. 177/209; 177/208; 177/254
[58] Field of Search ...................... 177/208, 254, 209

[56] References Cited

U.S. PATENT DOCUMENTS

| | | | |
|---|---|---|---|
| 2,639,613 | 5/1953 | Richmond | 177/208 |
| 3,261,203 | 7/1966 | Young | 177/208 |
| 4,184,555 | 1/1980 | Maltby et al. | 177/208 |
| 4,360,071 | 11/1982 | Dyck | 177/208 |
| 4,456,084 | 6/1984 | Miller | 177/254 X |
| 4,537,266 | 8/1985 | Greenberg | 177/208 |
| 4,569,407 | 2/1986 | Gray et al. | 177/208 |

Primary Examiner—Benjamin R. Fuller
Assistant Examiner—Randy W. Gibson
Attorney, Agent, or Firm—Bacon & Thomas

[57] ABSTRACT

A weighing scale of the type comprising a scale is disclosed wherein the weighing scale is table for bearing the thing to be measured; a first hydraulic cylinder disposed below the scale table; a feeler transmitting the pressure applied at the scale table to the first hydraulic cylinder; a second hydraulic cylinder connected to the first hydraulic cylinder by a pipe and disposed at a level below the first hydraulic cylinder to bear the pressure transmitted through the feeler; a probe forced to make a linear displacement corresponding to the amount of the pressure transmitted from the first hydraulic cylinder to said second hydraulic cylinder; and an electronic inductor to detect the range of the linear displacement and convert it into a corresponding digital data for display.

2 Claims, 3 Drawing Sheets

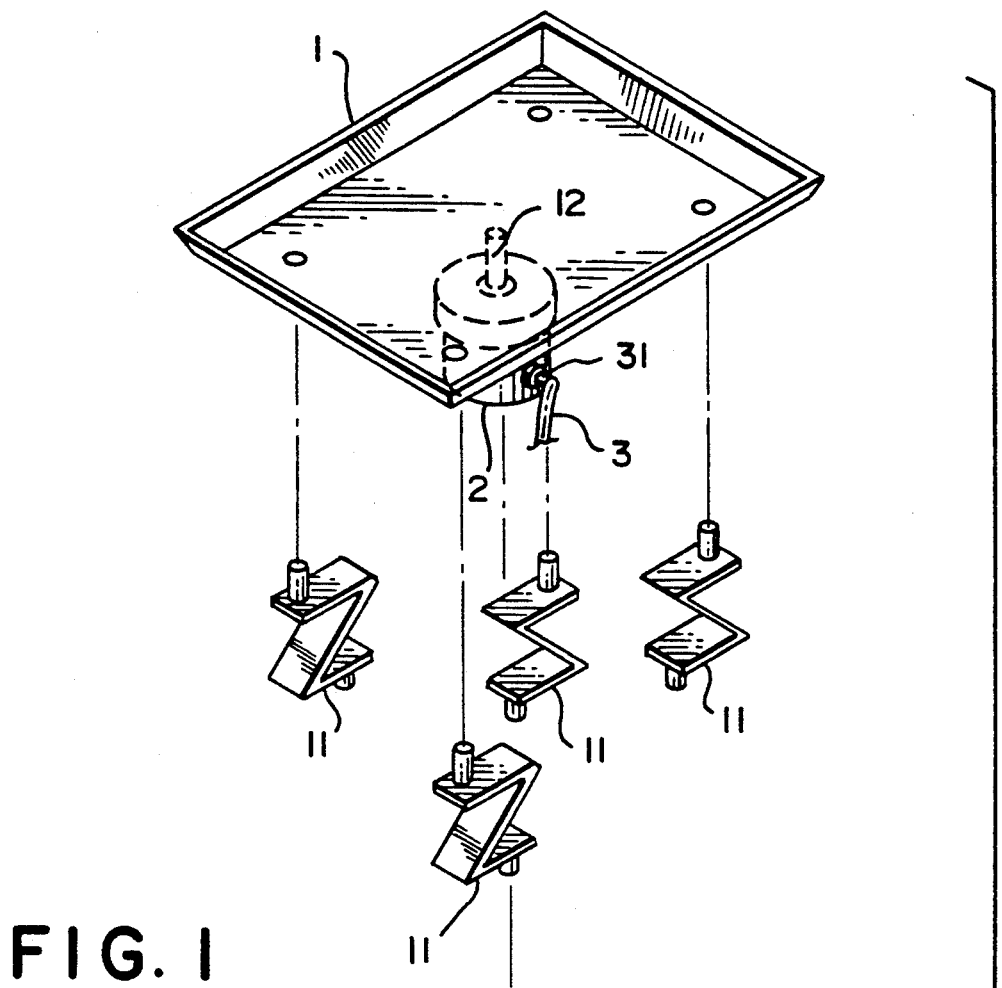
FIG. 1
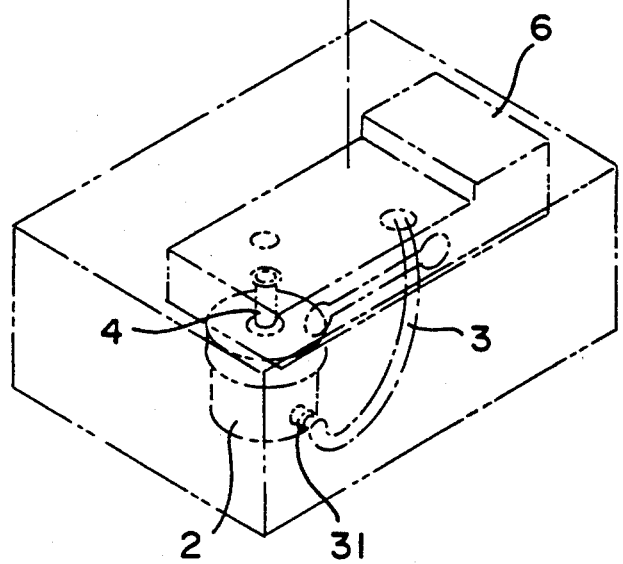

WEIGHING SCALE WITH FLUID PRESSURE TRANSMISSION MEANS

BACKGROUND OF THE INVENTION

1. Field of the Invention

The present invention relates to weighing scales and relates more particularly to a weighing scale which utilizes fluid pressure transmission means to accurately transmit the pressure applied at the scale table thereof to an electronic inductor for converting into digital data for display.

2. Description of the Prior Art

Various types of weighing devices such as a pan scale, pole scale, spring balance scale, platform scale and other mechanical and electronic weighing instruments have been disclosed for testing the weight of things. In the known mechanical scales, friction force is inevitably produced during pressure transmission, which causes error in final test. Further, determination error commonly happens during testing the weight of a thing by a spring balance scale. The use of an electronic scale completely eliminates visual observation error, however, it still can not eliminate pressure transmission error. Because a mechanical pressure transmitting mechanism is still commonly used in the known structures of electronic scales, friction force happens between the parts of the mechanical pressure transmitting mechanism during pressure transmitting operation. Therefore, pressure transmitting error must be reduced as low as possible so as to obtain a high precision weighing scale.

SUMMARY OF THE INVENTION

The present invention has been accomplished under the circumstances in view. It is therefore the main object of the present invention to provide a weighing scale for testing the weight of things, which utilizes hydraulic fluid for transmitting pressure to as to eliminate friction or error during pressure transmitting operation.

According to Pascal's principle, the pressure everywhere in a fluid is the same, so that pressure applied at one point is transmitted equally to all parts of the container. Therefore, fluid pressure transmitting method can completely eliminate pressure transmitting error. This is the basic concept of the present invention. According to the present invention, there is disclosed a weighing scale comprising a scale table for bearing the thing to be measured; a first hydraulic cylinder disposed below said scale table; a feeler transmitting the pressure applied at said scale table to said first hydraulic cylinder; a second hydraulic cylinder connected to said first hydraulic cylinder by a pipe and disposed at a level below said first hydraulic cylinder to bear the pressure transmitted through said feeler; a probe forced to make a linear displacement corresponding to the amount of the pressure transmitted from said first hydraulic cylinder to said second hydraulic cylinder; and an electronic inductor to detect the range of said linear displacement and convert it into a corresponding digital data for display.

BRIEF DESCRIPTION OF THE DRAWINGS

The foregoing and other objects, features and advantages of the present invention will be best understood from the following description, the appended claims and the accompanying drawings in which:

FIG. 1 is an exploded perspective view of the preferred embodiment of the weighing scale of the present invention;

DETAILED DESCRIPTION OF THE PREFERRED EMBODIMENT

Figure 2:
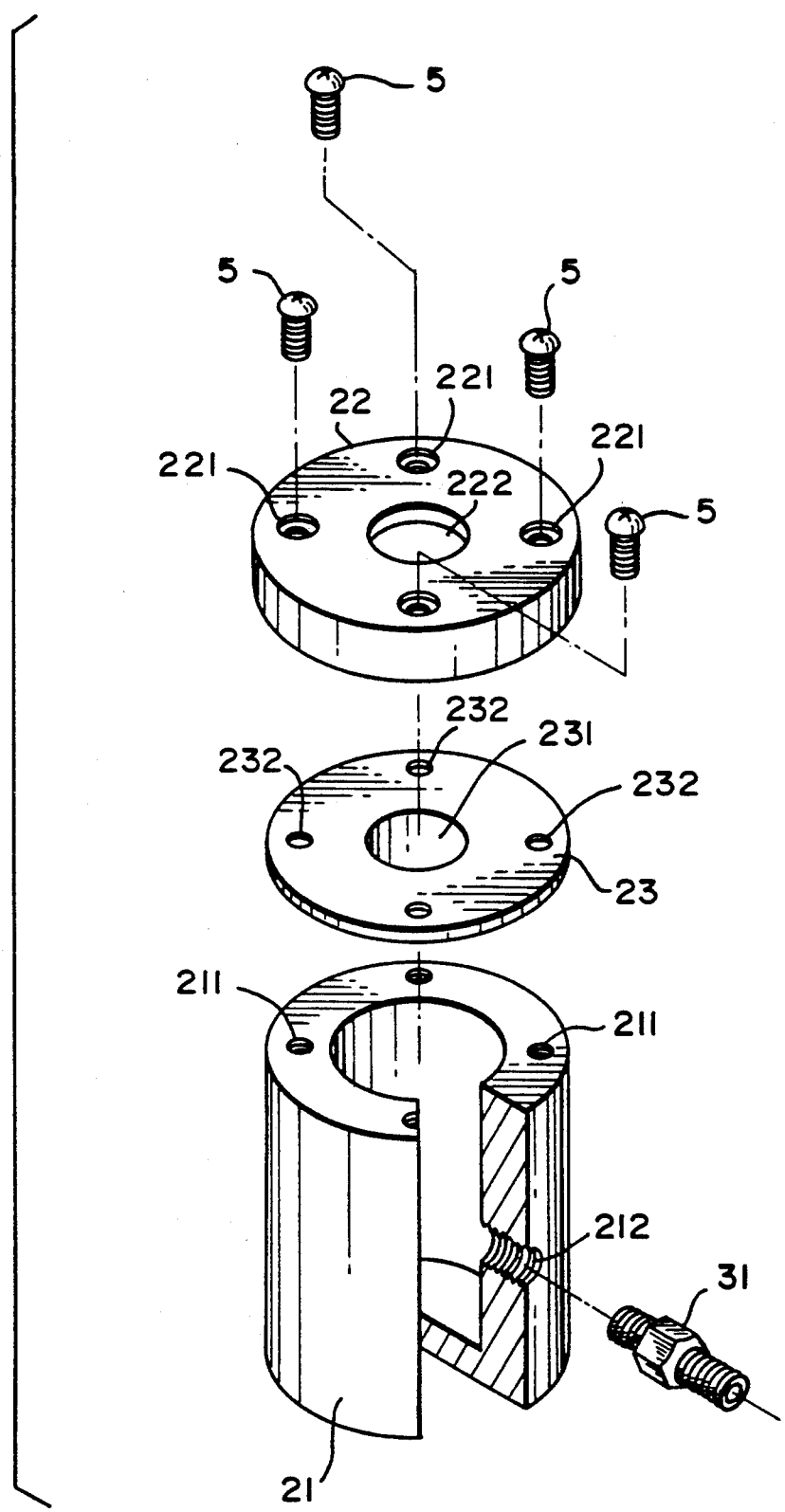
FIG. 2 is an exploded perspective view of the hydraulic cylinder thereof.

Referring to FIGS. 1 and 2, therein illustrated is the preferred embodiment of the weighing scale of the present invention which is generally comprised of a scale table 1, a first hydraulic cylinder 2 and a second hydraulic cylinder 2', a pipe 3, a probe 4, a plurality of screws 5 and an electronic inductor 6.

The scale table 1 is supported by a plurality of Z-bars 11, which absorb the pressure given to the scale table 1, having a feeler 12 extending downwards from the bottom edge thereof at the center and disposed in contact with the first hydraulic cylinder 2 below.

The hydraulic cylinders 2 and 2' each is comprised of a cylindrical container 21, a cover plate 22 and a diaphragm plate 23. The hydraulic cylinder 2 has a plurality of bolt holes 211 around the topmost edge thereof and a bolt hole 212 through the side wall thereof at a suitable location with a pipe connector 31 fastened therein for connecting the pipe 3. The cover plate 22 has a plurality of through-holes 222 corresponding to the bolt holes 211 on the cylindrical container 21, and a round hole 222 at the center. The diaphragm plate 23 has a plurality of through-holes 232 corresponding to the bolt holes 211 on the cylindrical container 21, and a circular recess 231 at the center. Screws 5 are respectively inserted through the through-holes 221 on the cover plate 22 and the through-holes 232 on the diaphragm plate 23 into the bolt holes 211 on the cylindrical container 21 to firmly secure the cover plate 22 to the cylindrical container 21 with the diaphragm plate 23 retained therebetween. The feeler 12 of the scale table 1 is inserted through the round hole 222 on the cover plate 22 of the first hydraulic cylinder and disposed in contact with the diaphragm plate 23 at the circular recess 231 thereof.

The second hydraulic cylinder 2' is disposed at a lower position and connected to the first hydraulic cylinder 2 by the pipe 3. Further, a feed hole (not shown) is made on the first hydraulic cylinder 2 for filling hydraulic fluid and, a drain valve (not shown) is made on the second hydraulic cylinder 2' for discharging hydraulic fluid.

The probe 4 is fastened in the second hydraulic cylinder 2' with the bottom end thereof connected to the circular recess 231 at the center of the diaphragm plate 23 of the second hydraulic cylinder 2' and the top end thereof disposed in contact with the electronic inductor 6. When the probe 4 is forced to press on the electronic inductor 6, the linear displacement thus measured is converted into corresponding digital data through the operation of a circuit board, for display through a liquid crystal display.

Figure 3:
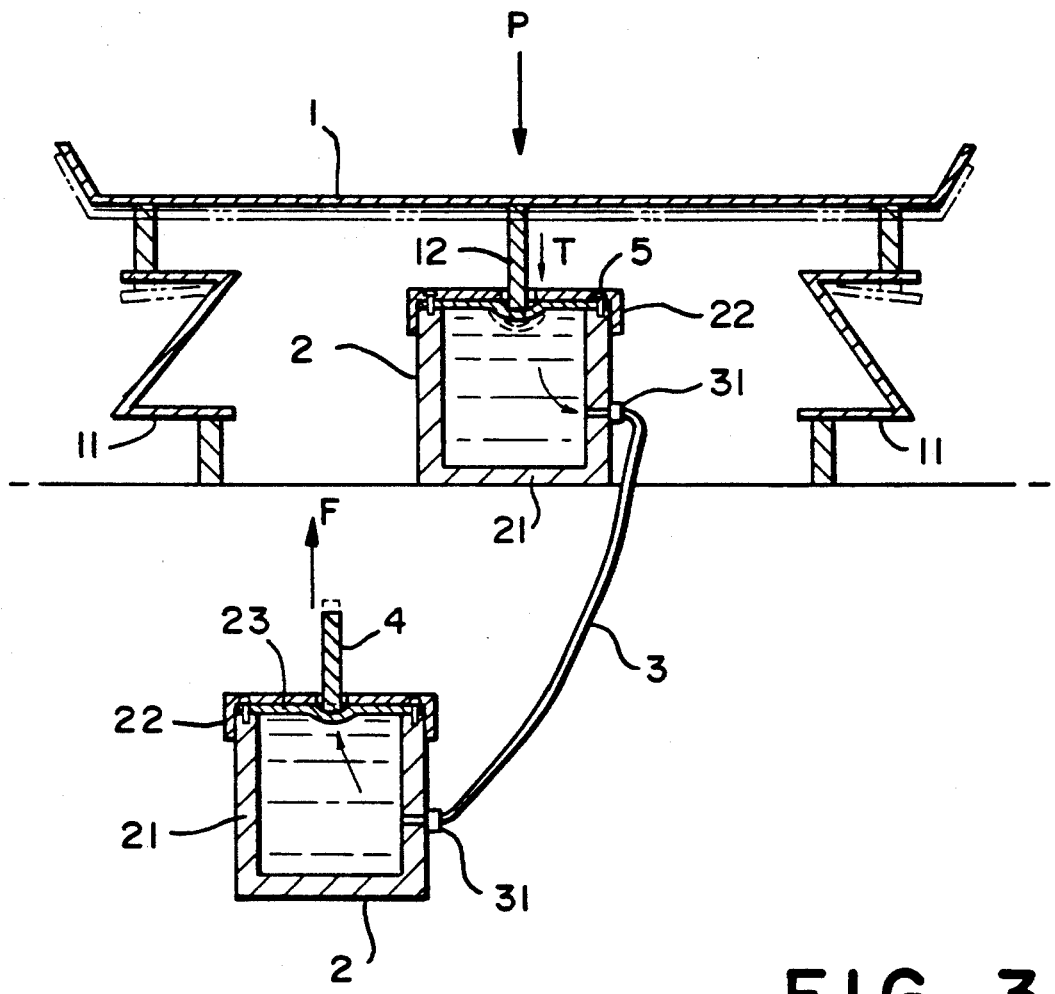
FIG. 3 depicts the operational flow of the present invention.

According to Pascal's principle, the pressure everywhere in a fluid is the same, so that pressure applied at one point is transmitted equally to all parts of the container. Referring to FIG. 3, when the scale table 1 bears a pressure P, the pressure P will be partly absorbed by the Z-bars 11, and at the same time, the feeler 12 bears a pressure T which is applied at the diaphragm plate 23, and therefore, a force F is transmitted through hydraulic fluid to the probe 4 on the second hydraulic cylinder 2'. Therefore, $$T \times A2 = F \times A1,$$

in which:

T = pressure at the feeler;
A2 = contact area between the probe 4 and the diaphragm plate 23;
F = the force transmitted to the probe 4;
A1 = the contact area between the feeler 12 and the diaphragm plate 23.

According to the aforesaid equation, in an enclosed hydraulic system in which the volumne is not changeable, if to confine the probe 4 to make a linear displacement within a certain range, i.e. within the induced area of the electronic inductor 6, it needs only to change the contact area between the feeler 12 and the diaphragm plate 23 and the contact area between the probe 4 and the diaphragm plate 23. By changing the contact area between the feeler 12 and the diaphragm plate 23 and the contact area between the probe 4 and the diaphragm plate 23, the present invention is suited for weighing light or heavy material. In making a mechanical weighing scale, the size, strength and hardness of the materials for the elements in the pressure transmitting structure have great concern with the precision. Therefore, in mechanical weighing scale, pressure transmission error is difficult to eliminate. The present invention is not just an application of Pascal's principle, it eliminates the friction problem between the hydraulic cylinder the the piston therein which is commonly seen in regular hydraulic press and jack.

I claim:

1. A weighing scale comprising:
   a scale table for bearing an object to be measured;
   a plurality of Z-bars supporting said scale table at corners thereof;
   a first hydraulic cylinder disposed below said scale table;
   a feeler disposed between said scale table and said first hydraulic cylinder for transmitting pressure applied at said scale table to said first hydraulic cylinder;
   a second hydraulic cylinder connected to said first hydraulic cylinder by a pipe, said second hydraulic cylinder being disposed at a level below said first hydraulic cylinder to bear the pressure being tranmitted through said pipe as sensed by said feeler;
   a probe forced to make a linear displacement corresponding to an amount of the pressure transmitted from said hydraulic cylinder to said second hydraulic cylinder; and
   electronic inductor means to detect a range of the linear displacement of said probe and convert said displacement into a corresponding digital data for display.

2. The weighing scale of claim 1, wherein each of said first and second hydraulic cylinders is comprised of a cylindrical container, a cover plate covered on said cylindrical container at a top thereof, and a gasket retained between said cover plate and said cylindrical container, said gasket having a circular diaphragm at a center thereof for holding said feeler or said probe respectively.

* * * * *